Patented Nov. 11, 1941

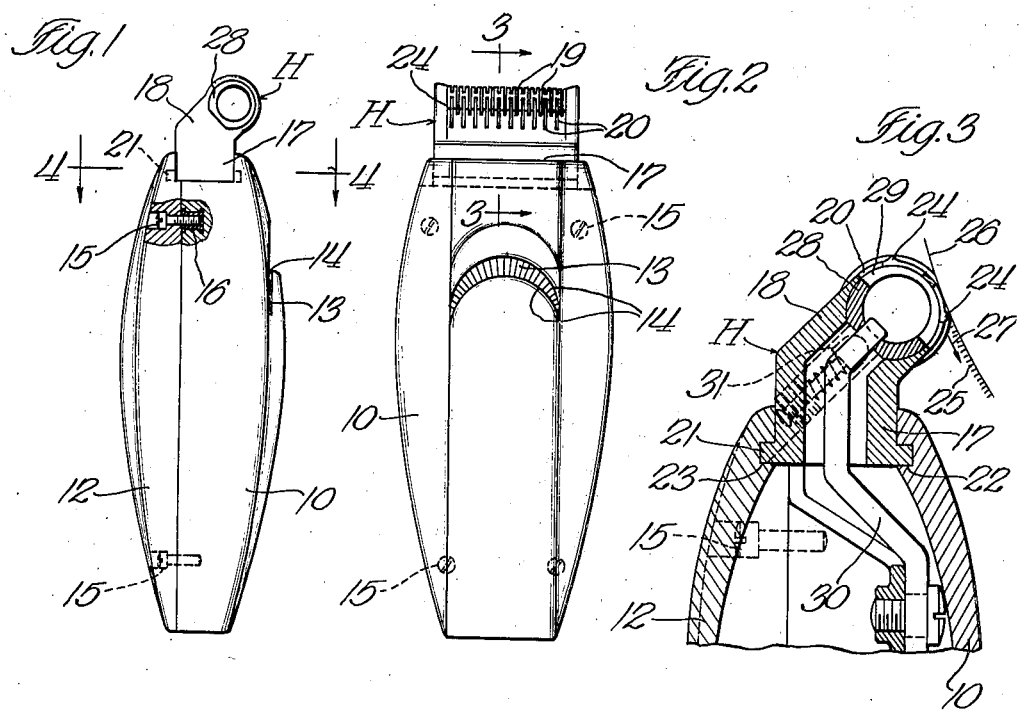
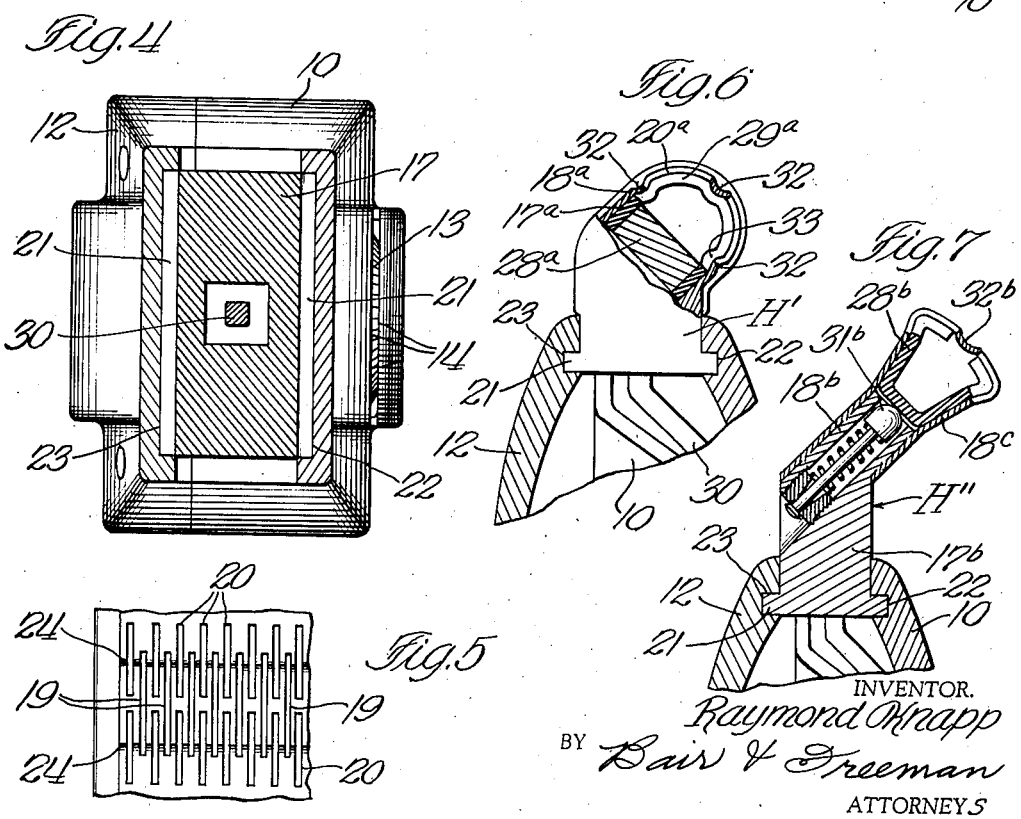

2,262,684

UNITED STATES PATENT OFFICE 2,262,684

DRY SHAVER STRUCTURE

Raymond Knapp, Long Island City, N. Y., assignor to Knapp-Monarch Company, St. Louis, Mo., a corporation of Missouri Application September 19, 1938, Serial No. 230,645

4 Claims. (Cl. 30—43)

An object of my present invention is to provide a dry shaver structure in which the outer cutter and an angular supporting head therefor are integrally formed, as distinguished from the outer cutter being mounted in an angular head as shown in my copending application, Serial No. 173,104, filed November 6, 1937, patented August 19, 1941, No. 2,253,037.

Another object is to provide a dry shaver in which the outer cutter extends longitudinally from the end of the motor casing and has an angularly arranged outer end to mount the skin-engaging plate of the outer cutter at the desired angle relative to the motor casing which serves as a handle for the dry shaver, the skin-engaging plate when engaging the skin of the user permitting the motor casing to be held at a natural angle relative to the skin, such angle being the one experienced by users of safety razors.

Another object is to provide a dry shaver in which the combined outer cutter and head are retained at one end of the motor casing by interlocking coaction between the head and the casing, the casing being formed in two parts which, when assembled together, retain the head against dislodgment from the casing.

A further object is to provide a dry shaver in which the cutting face of the outer cutter is arranged at a natural shaving angle relative to the axis of the motor casing and is formed integrally with a head member embedded in one end of the casing and having laterally extending flanges located in grooves of the head, to prevent removal of the head from the casing.

Still a further object is to provide an outer cutter which has a comb action resulting from forming indentations therein which permit hairs which have been bent down against the skin by the outer cutter teeth, again being raised to an upstanding position, whereupon they may then pass into the teeth of the outer cutter and be sheared off by the inner cutter.

With these and other objects in view, my invention with respect to its features which I believe to be novel and patentable will be pointed out in the claims appended hereto. For a better detailed understanding of the invention, reference is made to the following description and to the accompanying drawing, in which Figure 1 is a side elevation of a dry shaver embodying my invention, a portion of the casing being broken away and other portions thereof being shown in section;

Figure 2 is a front elevation of the shaver;

Figure 3 is an enlarged sectional view on the line 3—3 of Figure 2, showing the mounting of the shaver head in the motor casing;

Figure 4 is an enlarged sectional view on the line 4—4 of Figure 1, showing further details of the mounting of the head in the casing;

Figure 5 is an enlarged layout view of the slot arrangement in the outer cutter of my shaver;

Figure 6 is a sectional view of a modified form of shaver head;

Figure 7 is a sectional view of another modified form of head.

On the accompanying drawing I have used the reference numerals 10 and 12 to indicate a dry shaver casing. The casing 10—12 is formed of two parts, with the part 12 constituting a cover and the part 10 being the casing proper in which the electric motor (not shown) for driving the shaving mechanism is mounted. The starting wheel for the motor is shown at 13, where it is exposed through a slot 14 of the casing proper 10. The cover 12 may be secured to the casing proper 10 as by screws 15 passing through the cover and into threaded bushings 16 embedded in the casing proper 10.

I provide a head member H having an upright base portion 17 and an angular portion 18. The angular portion 18 constitutes an outer hair cutter and is provided with a row of slots 19 and two rows of slots 20. The base portion 17 is provided with lateral flanges 21 adapted to be received in grooves 22 and 23 of the casing portions 10 and 12. The flanges and the grooves, it will be noted, terminate short of the sides of the casing, as shown in Figure 4, whereby the flanges are retained against longitudinal movement by the ends of the grooves 22 and 23 when the casing portions are assembled. The flanges extending laterally into the groove prevent removal of the head from the casing. This manner of connection provides for a permanent mounting of the head in the casing as long as the casing is retained closed, but the head can be demounted by opening the casing. This eliminates the usual set screw or other retainer means for the head relative to the casing.

The slots 19 and 20 are staggered relative to each other, as clearly shown in Figure 5. The slots 20 are arranged end to end and spaced from each other laterally of the cutter. The ends of the slots 19 overlap the ends of the slots 20. This provides unbroken metal between the ends of the slots 20 so that considerable reinforcement is thereby had for the relatively thin outer skin-engaging portion of the head H, as distinguished from the usual arrangement wherein the slots extend completely across from side to side of the head. The staggered arrangement also facilitates entry of hairs into the slots for effective shearing operation of the dry shaver.

To further aid in the shearing operation, I provide projections between the slots 19 and 20. These are arranged adjacent the staggered ends of the slots and serve to effect a combing action of the hairs 25, as shown in Figure 3, when the outer cutter is moved along the skin 26 of the user. The lower teeth projections or comb teeth 24 in this figure are effecting the combing action while the shaver head is being moved downwardly in the direction of the arrow 27.

A tubular inner cutter 28 is illustrated, which is provided with slots 29 shearingly coacting with the slots 19 and 20. The inner cutter is reciprocated relative to the outer cutter by an arm 30 oscillated by the motor in the usual manner. Spring pressed plunger pins 31 serve to retain the teeth in shearing coaction with each other.

In Figure 6, I show a modification in which a head H' has an upright portion 17ª and an angular portion 18ª. An inner cutter 28ª has slots 29ª coacting with the slots 20ª of the outer cutter. Instead of having the comb teeth 24 I provide a plurality of indentations 32, which cause the material between the slots 20ª adjacent the indentations to act as comb teeth to aid in guiding the hairs into the slots. The inner cutter 28ª has similar indentations 33 to clear the indentations 32 as the inner cutter reciprocates relative to the outer cutter.

In Figures 7 I show a modification in which the outer cutter, indicated at 18ᶜ, is of modified shape and formed of sheet metal. The sheet metal may be spot welded to an angular portion 18ᵇ of a head H" having an upright portion 17ᵇ. This figure also illustrates more clearly the spring urged pin 31ᵇ adapted to cause the inner hair cutter 28ᵇ to contact with the outer cutter. The outer cutter in this instance is also provided with an indentation 32ᵇ, while the inner cutter is open adjacent the indentation to avoid striking it during oscillations of the inner cutter.

In accordance with the provisions of the patent statutes, I have described the principle of operation of my invention together with an illustration of dry shavers which I consider to represent the best embodiments thereof, but I desire to have it understood that the structure disclosed is only illustrative and that the invention may be carried out by other means within the scope of the appended claims.

What I claim as new and desire to secure by Letters Patent of the United States is:

1. In a dry shaver structure, a casing comprising separate complementary parts positioned face to face, a head member having a base portion mounted between the two parts thereof, means for securing the two parts of said casing together to retain the head member mounted on the casing, said casing parts having together a substantially rectangular shape in cross section and a rectangular slot therein, grooves formed at the long sides of said slot, said head member having flanges received in said grooves, said grooves terminating short of the faces of said casing parts and having closed ends formed integral with the casing covering the ends of said flanges.

2. In a dry shaver structure, a casing, a head member mounted on said casing, said head member having a portion forming an outer hair cutter and provided with a skin engaging plate of uniform thickness arranged at an acute angle relative to the longitudinal axis of said casing, an inner hair cutter in said outer cutter, said outer and inner cutters having teeth for shearing coaction with each other upon relative reciprocation of said cutters, said outer cutter having a plurality of shallow, curved longitudinal indentations arranged laterally across the teeth thereof which effect a comb action for the teeth adjacent the indentations to aid in guiding hair into the teeth and said inner cutter having curved indentations surrounding the inwardly projecting portions of the indentations of said outer cutter and substantially in surface contact therewith.

3. In a dry shaver structure, a casing, a head member mounted on the casing and having a portion forming an outer hair cutter and an inner hair cutter in said outer cutter, said outer and inner cutters having teeth which shearingly coact with each other upon relative reciprocation of said cutters, said outer cutter having a plurality of parallel longitudinal indentations across the teeth thereof depressed beneath the skin contacting surface of the face of said outer cutter which effect a comb action on opposite sides of the indentations for the teeth adjacent the indentations to aid in guiding hair into the teeth, said inner cutter having parallel recesses complementary to and in contact with the inner faces of said indentations.

4. In a dry shaver structure, a casing, an outer hair cutter carried thereby, an inner hair cutter reciprocable in said outer cutter, said outer and inner cutters having each a series of bars with slots therebetween to shearingly coact with each other upon relative reciprocation of the cutters, said outer cutter having a plurality of the parallel longitudinal indentations depressed inwardly relative to the shearing plane between said inner and outer cutters which effect a comb action for the outer cutter adjacent the indentations to aid in guiding hairs into the slot thereof.

RAYMOND KNAPP.